L. L. GOHEEN.
WEED, STUBBLE, AND SEED BURNING MACHINE.
APPLICATION FILED MAR. 14, 1910.
978,875.
Patented Dec. 20, 1910.
3 SHEETS—SHEET 1.
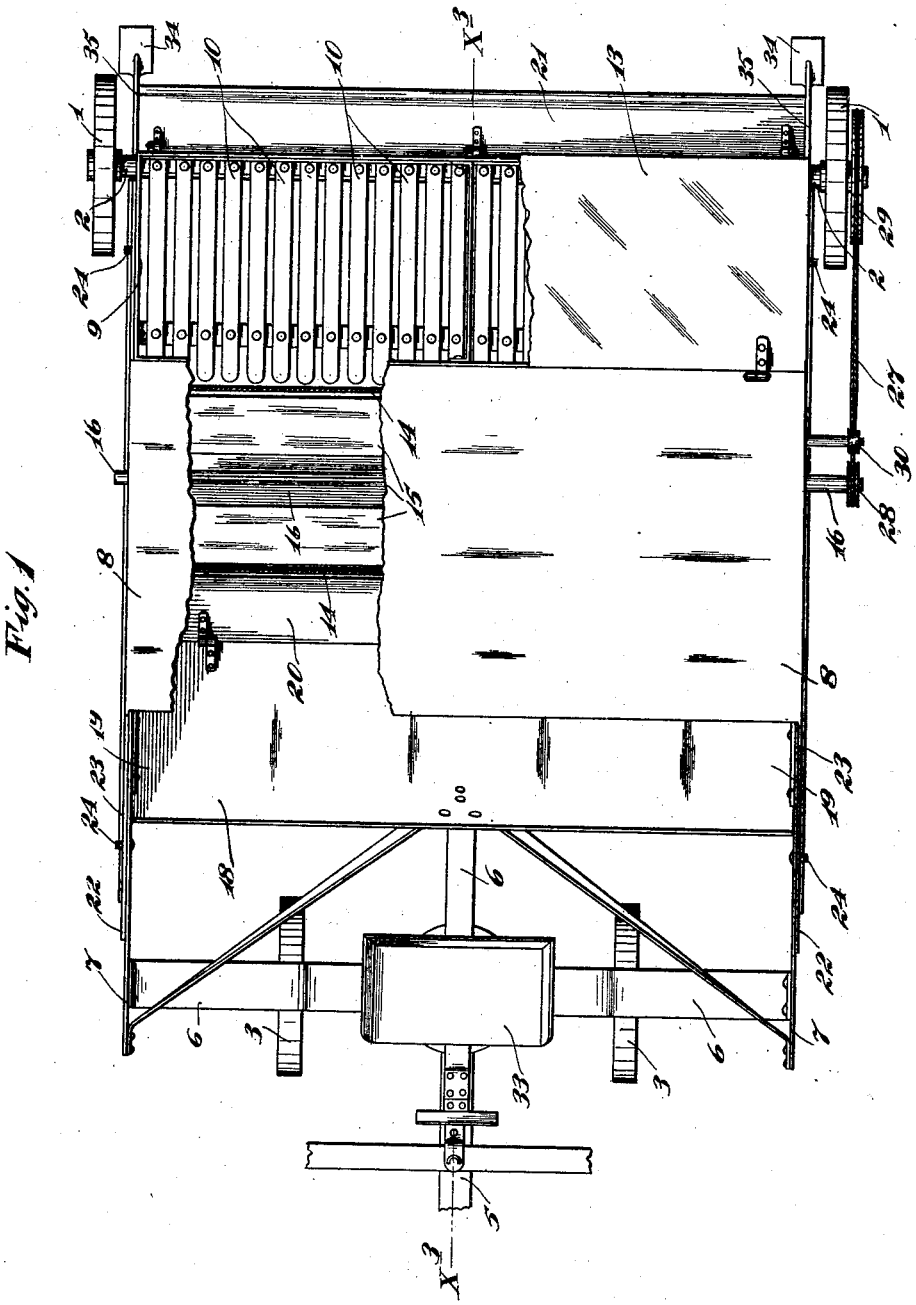

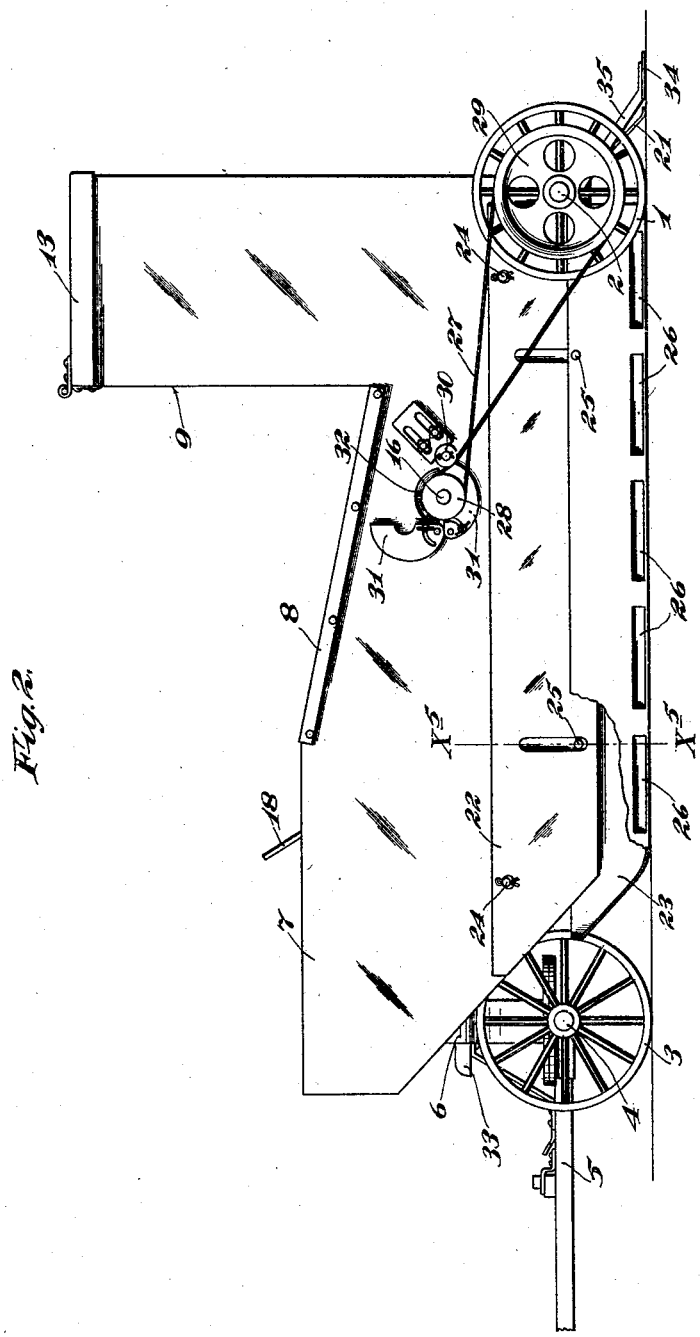

L. L. GOHEEN.
WEED, STUBBLE, AND SEED BURNING MACHINE.
APPLICATION FILED MAR. 14, 1910.
978,875.
Patented Dec. 20, 1910.
3 SHEETS—SHEET 3.
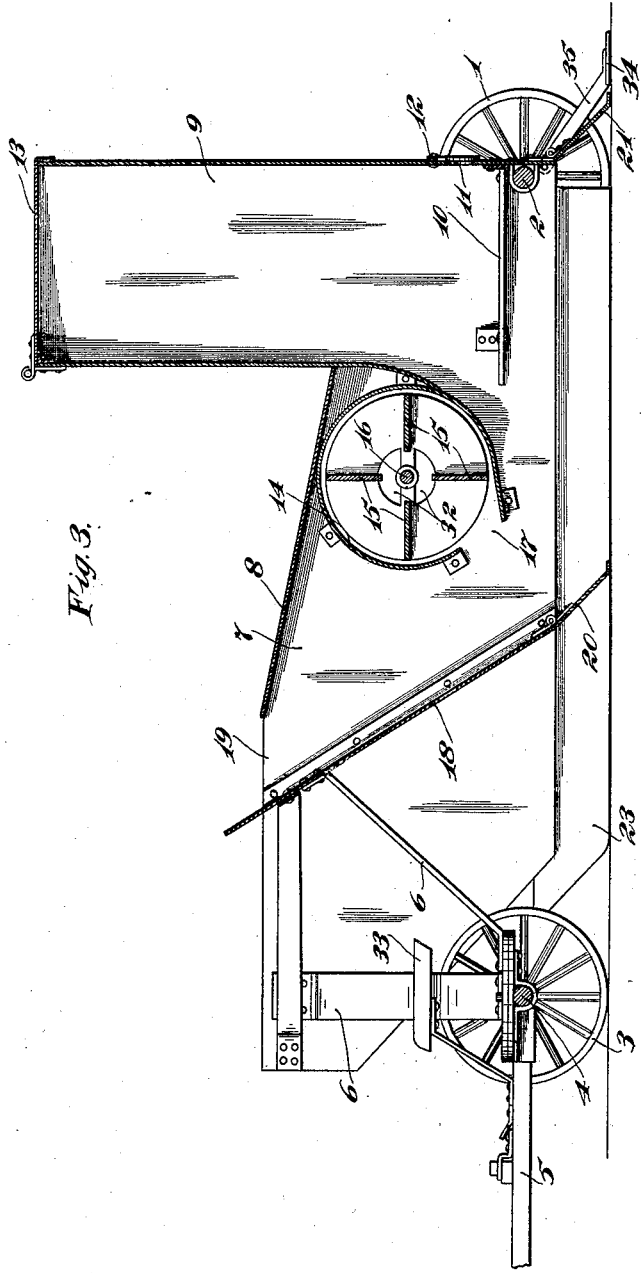
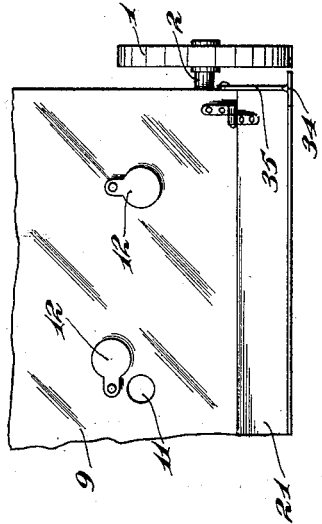
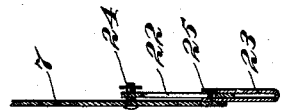

UNITED STATES PATENT OFFICE.

LEONARD L. GOHEEN, OF SHERWOOD, NORTH DAKOTA.

WEED, STUBBLE, AND SEED BURNING MACHINE.

978,875.     Specification of Letters Patent.     Patented Dec. 20, 1910.

Application filed March 14, 1910. Serial No. 549,289.

*To all whom it may concern:*

Be it known that I, LEONARD L. GOHEEN, a citizen of the United States, residing at Sherwood, in the county of Ward and State of North Dakota, have invented certain new and useful Improvements in Weed, Stubble, and Seed Burning Machines; and I do hereby declare the following to be a full, clear, and exact description of the invention, such as will enable others skilled in the art to which it appertains to make and use the same.

My invention has for its object to provide a simple and efficient machine for burning on the ground stubble, loose straw, foul seeds, weeds, noxious grass and the like and, to this end, the invention consists of the novel devices and combinations of devices hereinafter described and defined in the claims.

In the accompanying drawings which illustrate the invention, like characters indicate like parts throughout the several views.

Referring to the drawings, Figure 1 is a plan view, with some parts broken away, showing the improved machine; Fig. 2 is a side elevation of the machine; Fig. 3 is a vertical section taken on the line $x^3$ $x^3$ of Fig. 1; Fig. 4 is a fragmentary view in rear elevation, showing a portion of the machine; and Fig. 5 is a detail in section taken on the line $x^5$ $x^5$ of Fig. 2.

In this improved machine, a fuel magazine, a fan or blower and a casing constituting a combustion chamber are mounted on a four-wheel truck and, hence, arranged to be driven over the ground, and the fan is arranged to produce a forced draft which will cause the flames to engage and burn such material such as stubble, weeds, vines, grass or foul seeds which lie upon or project above the ground.

Of the parts of the truck, the rear wheels 1 are mounted on a rear axle 2, and the front wheels 3 are mounted on the front axle 4, and is provided with a pole 5 that is pivotally connected to a front bracket 6. The main casing is made up chiefly of a pair of laterally spaced side plates 7 and a top plate 8 and which side plates, at their front ends, are rigidly secured to the front bracket 6 and, at their rear ends, are rigidly secured to the rear axle 2.

The fuel magazine 9, which is preferably arranged to contain straw, is a rectangular upright structure, preferably constructed of sheet metal, and is secured to the rear portions of the side plates 7 and, in fact, constitutes a part of the casing. The bottom of the magazine 9 is open and is provided with grate bars 10 which, however, do not extend to the front wheel of the said magazine. In its rear wall, just above the grate 10, the magazine is provided with air inlet or draft ports 11 adapted to be closed by pivoted dampers 12. The top of the magazine is in the form of a hinged cover 13 adapted to be raised to permit the magazine to be filled with straw.

The fan or blower, which is preferably of standard construction, is made up of a casing 14 and a rotary fan head 15, the latter of which is secured to a driving shaft 16. The fan case 14 is approximately cylindrical, but is provided with a tangential discharge passage 17. The lower portion of the fan case 14 constitutes an extension of the forwardly and downwardly curved front plate of the magazine 9 and the discharge passage 17 of the said fan case is arranged to direct a blast of air against an upwardly inclined deflecting plate 18 which, as shown, is rigidly secured to the side plates 7, with its upper portion spaced from the front edge of the top plate, to afford a flame or hot air discharge outlet passage 19. It may be here stated that the lower and front portions of the fan casing 14 and the deflecting plate 18 form a forwardly and upwardly extended flame discharge passage which leads from the grate 10 to the outlet 19. The deflecting plate 18 is provided with a hinged rearwardly inclined ground plate 20, the lower edge of which is held on the ground by gravity. A similar rearwardly inclined ground engaging plate 21 is hinged to the lower edge of the rear plate of the magazine 9. Vertically movable runner plates are loosely secured to the lower edges of the side plates 7. These runner plates are preferably made up each of two sections 22 and 23. The sections 22 are attached to the sides of the side plates 7 by studs 24 which permit limited lateral swinging movements thereof. The lower sections 23 are made in the form of channel-shaped shoes which embrace the lower edges of the plates 22 and are connected thereto with freedom for vertical movements, by slot and pin connections 25, The forward ends of the shoe sections 23 are inclined so that they will slide freely upon the ground. The outer plates of the shoe members 23 near their bottoms are shown as provided with openings 26, through which dirt may fall out of the shoe. The runner plates 22—23 and the ground plates 20—21 quite closely inclose the lower portion of the casing so that the flames drawn downward by the fan on the grates will be brought into contact with the ground. The fan is driven from one of the traction wheels and, as shown, this is accomplished by a rope belt 27 which runs over a sheave 28 on the fan shaft 16 and over a larger sheave 29 carried by one of the rear wheels 1.

The numeral 30 indicates a belt tightener applied to one of the side plates 7.

The numeral 31 indicates a valve plate for opening and closing air inlet passages 32 which lead through the side plates 7 into the eye of the fan, preferably at both sides of the machine.

The numeral 33 indicates a driver's seat shown as applied to the pole 5.

When the fire is burning in the lower portion of the fuel magazine 9 and the machine is drawn forward, the same will be driven in the direction of the arrow marked thereon in Fig. 3, and the flames from the burning straw or other fuel will be drawn downward into contact with the ground and thence upward and outward through the discharge passage 19 in the top of the case, with a result already fully considered.

To prevent fire from spreading after the machine has passed, I provide a pair of laterally spaced ground engaging so-called drag plates 34, carried at the rear ends of arms 35, the front ends of which are pivotally attached to the rear portions of the side plates 7. These drag plates are held in contact with the ground by gravity or, if desired, by the combined action of gravity and spring pressure, and they engage the ground with sufficient force to stamp out the fire from the light burning stubble over which they are passed. Said plates 34 are located one immediately at the rear of each side plate 7, so that they will properly accomplish the above noted function. The so-called runner plates 22—23 and the hinged ground engaging plates 20—21 adapt themselves to irregularities in the ground and, as they engage the ground but lightly, do not add greatly to the force required to draw the machine.

What I claim is:—

1. In a machine of the kind described, the combination with a casing having a flame discharge passage, said flame discharge passage having a deflecting plate formed on one side thereof, of a fuel magazine extending the full width of said casing, a grate at the bottom of said fuel magazine, and a fan located between said flame discharge passage and said fuel magazine and with its casing spaced apart from said grate to afford a second flame passage through which said fan may draw the flames onto or over the ground, substantially as described.

2. In a machine of the kind described, the combination with a casing having yielding sides each comprising an upper section and a lower section, the said upper section being connected to said casing with freedom for swinging movements and the said lower section being connected to said upper section with freedom for vertical movements, of a fuel magazine and a fan, substantially as described.

3. In a machine of the kind described, the combination with a casing having yielding sides each comprising an upper section and a lower section, the said upper section being connected to said casing with freedom for swinging movements and said lower section being in the form of a channel shaped shoe which embraces the lower edge of said upper section and connected thereto with freedom for vertical movements, of a fuel magazine, and a fan, substantially as described.

4. In a machine of the kind described, the combination with a casing having a forwardly and upwardly extending flame discharge passage, of a vertically extended fuel magazine open at its bottom except for a grate, and a fan located between said flame discharge passage and said fuel magazine and arranged to produce a forced draft and to draw the flames from said grate onto or over the ground and to discharge the same through said flame discharge passage, substantially as described.

In testimony whereof I affix my signature in presence of two witnesses.

LEONARD L. GOHEEN.

Witnesses:
O. J. CLARK,
E. R. HAINES.